United States Patent [19]

Kosin et al.

[11] Patent Number: 4,888,160

[45] Date of Patent: Dec. 19, 1989

[54] PROCESS FOR PRODUCING CALCIUM CARBONATE AND PRODUCTS THEREOF

[75] Inventors: John A. Kosin, Bel Air; Claude R. Andrews, Pasadena, both of Md.

[73] Assignee: J.M. Huber Corporation, Rumson, N.J.

[21] Appl. No.: 47,318

[22] Filed: May 8, 1987

Related U.S. Application Data

[63] Continuation-in-part of Ser. No. 811,230, Dec. 20, 1985, abandoned.

[51] Int. Cl.$^4$ .......................... C01F 5/24; C01F 11/18
[52] U.S. Cl. ..................... 423/430; 423/419 P; 423/432; 423/628; 428/156; 422/234
[58] Field of Search ............... 423/419 P, 430, 432, 423/628; 428/156; 422/234; 261/DIG. 75, DIG. 74

[56] References Cited

U.S. PATENT DOCUMENTS

| | | | |
|---|---|---|---|
| 1,740,441 | 12/1929 | Chogo | 261/DIG. 75 |
| 1,808,956 | 6/1931 | Ketterer | 261/DIG. 75 |
| 1,862,176 | 6/1932 | Church et al. | 423/432 |
| 2,058,503 | 10/1936 | Rafton et al. | 423/432 |
| 2,062,255 | 11/1936 | Brooks et al. | 134/58 |
| 2,081,112 | 5/1937 | Statham et al. | 423/432 |
| 2,300,642 | 11/1942 | Booth | 261/DIG. 75 |
| 2,631,922 | 3/1953 | Schur et al. | 423/431 |
| 2,979,380 | 4/1960 | Miller | 423/432 |
| 3,126,253 | 3/1964 | Podschus | 423/432 |
| 3,268,387 | 8/1966 | Casciani et al. | 423/432 |
| 3,320,026 | 5/1967 | Waldeck | 423/432 |
| 3,502,441 | 3/1970 | Hudson | 23/259.1 |
| 3,960,175 | 6/1976 | Liepe et al. | 134/604 |
| 3,975,503 | 8/1976 | Hauschild et al. | 423/421 |
| 4,157,379 | 6/1979 | Arika et al. | 423/432 |
| 4,207,180 | 6/1980 | Chang | 261/DIG. 75 |
| 4,244,933 | 1/1981 | Shibazaki et al. | 423/432 |
| 4,367,207 | 1/1983 | Vanderheiden | 423/432 |
| 4,370,304 | 1/1983 | Hendriks et al. | 422/224 |
| 4,576,819 | 3/1986 | Miyata et al. | 424/156 |

FOREIGN PATENT DOCUMENTS

| | | | |
|---|---|---|---|
| 51-10199 | 1/1976 | Japan | 423/432 |
| 53-73498 | 6/1978 | Japan | 423/432 |
| 58-115022 | 7/1983 | Japan | 423/432 |
| 59-223225 | 12/1984 | Japan | 423/432 |
| 60-103025 | 6/1985 | Japan | 423/432 |

OTHER PUBLICATIONS

Balasico et al., Hydro Thermal Growth of Calicite from Alkali Carbonate Solutions, Mat. Res. Bull., vol. 7, #12, pp. 1461-1472, Dec. 72, Perstamon Press.

*Primary Examiner*—Gregory A. Heller
*Attorney, Agent, or Firm*—Harold H. Flanders; Alec H. Horn; Robert L. Price

[57] ABSTRACT

A process for producing calcium carbonate from calcium hydroxide derived from, for example, limestone, comprises injecting a gas containing carbon dioxide into a recirculating stream flowing in a recycle piping system in communication with a reaction vessel. The carbon dioxide containing gas is injected at a turbulent area located in the recycle piping system. By controlling reaction parameters including pH and temperature, novel calcium carbonate products are formed by the process.

20 Claims, 6 Drawing Sheets

PROCESS FOR PRODUCING CALCIUM CARBONATE AND PRODUCTS THEREOF

RELATED APPLICATION

This application is a continuation-in-part application of the commonly assigned copending application Ser. No. 811,230, filed Dec. 20, 1985, now abandoned.

FIELD OF THE INVENTION

The present invention relates to a process for producing calcium carbonate and to products produced by the process of the invention. More particularly, the invention relates to a process for producing calcium carbonate from calcium hydroxide derived from, for example, limestone, using a carbonation process and to the precipitated calcium carbonate products produced by such a process.

BACKGROUND OF THE INVENTION

Calcium carbonate which is produced by chemical means is often referred to as precipitated calcium carbonate. Precipitated calcium carbonate has various advantages over the mined, natural calcium carbonate materials. For example, the precipitated calcium carbonate is pure and exhibits higher brightness and opacity, particularly when used as a filler in paper. Additionally, the particle size, particle shape and other physical properties of precipitated calcium carbonate may be controlled by reaction conditions in order to adapt the precipitated product for various uses. Generally, calcium carbonate may be precipitated as either aragonite, the metastable form of calcium carbonate, or calcite, the stable form of calcium carbonate, or mixtures thereof, depending on reaction conditions. Generally, calcite is superior to argonite, particularly in alkaline sized paper properties.

Naturally occurring, mined calcium carbonate may be subjected to a heat treatment such as calcination to produce quick lime (calcium oxide). A well known method for producing calcium carbonate using quick lime is as a byproduct in the production of caustic soda from soda ash. The reaction proceeds according to the following equation:

$$CaO + H_2O + Na_2CO_3 \rightarrow NaOH + CaCO_3$$

Such methods are disclosed in the Church et al. U.S. Pat. No. 1,862,176, wherein the $CaCO_3$ wet cake is treated with additional $Na_2CO_3$, $CO_2$, and $CaCl_2$ to remove alkali and in the Brooks et al U.S. Pat. No. 2,062,255, wherein an excess of lime is used in the causticization reaction and the resultant wet cake is treated with additional soda ash. The Casciani et al. U.S. Pat. No. 3,268,387 and the Miller U.S. Pat. No. 2,979,380 also disclose methods for producing precipitated calcium carbonate using causticization reactions. Many commercial caustic plants, however, have discontinued these methods in favor of producing caustic by the electrolysis of common salt, whereby chlorine and hydrogen are also produced Alternatively, it is well known to slake the quick lime in water to form a calcium hydroxide slurry through which carbon dioxide is then bubbled to precipitate calcium carbonate according to the following reactions:

$$CaO + H_2O \rightarrow Ca(OH)_2$$

$$Ca(OH)_2 + CO_2 \rightarrow CaCO_3 + H_2O$$

Methods for carbonating calcium hydroxide slurries are disclosed in the Rafton et al. U.S. Pat. No. 2,058,503 and the Statham et al. U.S. Pat. No. 2,081,112. Generally, carbon dioxide is bubbled through a vigorously agitated calcium hydroxide slurry solution. Additional carbonation methods are disclosed in the Waldeck U.S. Pat. No. 3,320,026 and the Vanderheiden U.S. Pat. No. 4,367,207.

A disadvantage of the carbonation methods known in the art is that the carbon dioxide utilization efficiency, at best, approaches only about 60%, and it is often difficult and costly to recover the unused carbon dioxide. Accordingly, a need exists to develop a carbonation method for producing precipitated calcium carbonate which provides an improved carbon dioxide utilization efficiency.

SUMMARY OF THE INVENTION

It is therefore an object of the present invention to provide a method for producing precipitated calcium carbonate which is more efficient and economical than known processes. More particularly, it is an object of the present invention to provide a process for producing precipitated calcium carbonate from calcium hydroxide derived from limestone by employing a carbonation reaction. It is an additional object of the present invention to provide a carbonation process for producing precipitated calcium carbonate, which process provides efficient utilization of the carbon dioxide used in the carbonation process. It is a further object of the invention to provide a carbonation process for producing precipitated calcium carbonate which provides up to 100% carbon dioxide utilization efficiency. It is also an object of the present invention to provide various novel precipitated calcium carbonate products.

These and additional objects are provided by the process according to the present invention for producing precipitated calcium carbonate from calcium hydroxide derived from limestone. The process according to the present invention comprises injecting a gas containing carbon dioxide into a recirculating stream flowing in a recycle piping system which is in communication with a reaction vessel. The carbon dioxide-containing gas is injected at a turbulent point or area located in the recycle piping system in order to improve the efficiency of the carbon dioxide utilization in the carbonation process. The present invention also relates to the novel precipitated calcium carbonate products which are formed by the process according to the present invention. Additionally, by controlling the reaction parameters, including pH and temperature, of the process according to the present invention, various properties of the novel precipitated calcium carbonate products may be controlled.

These and additional objects and advantages will be more fully understood in view of the following detailed description.

DETAILED DESCRIPTION

Figure 1:
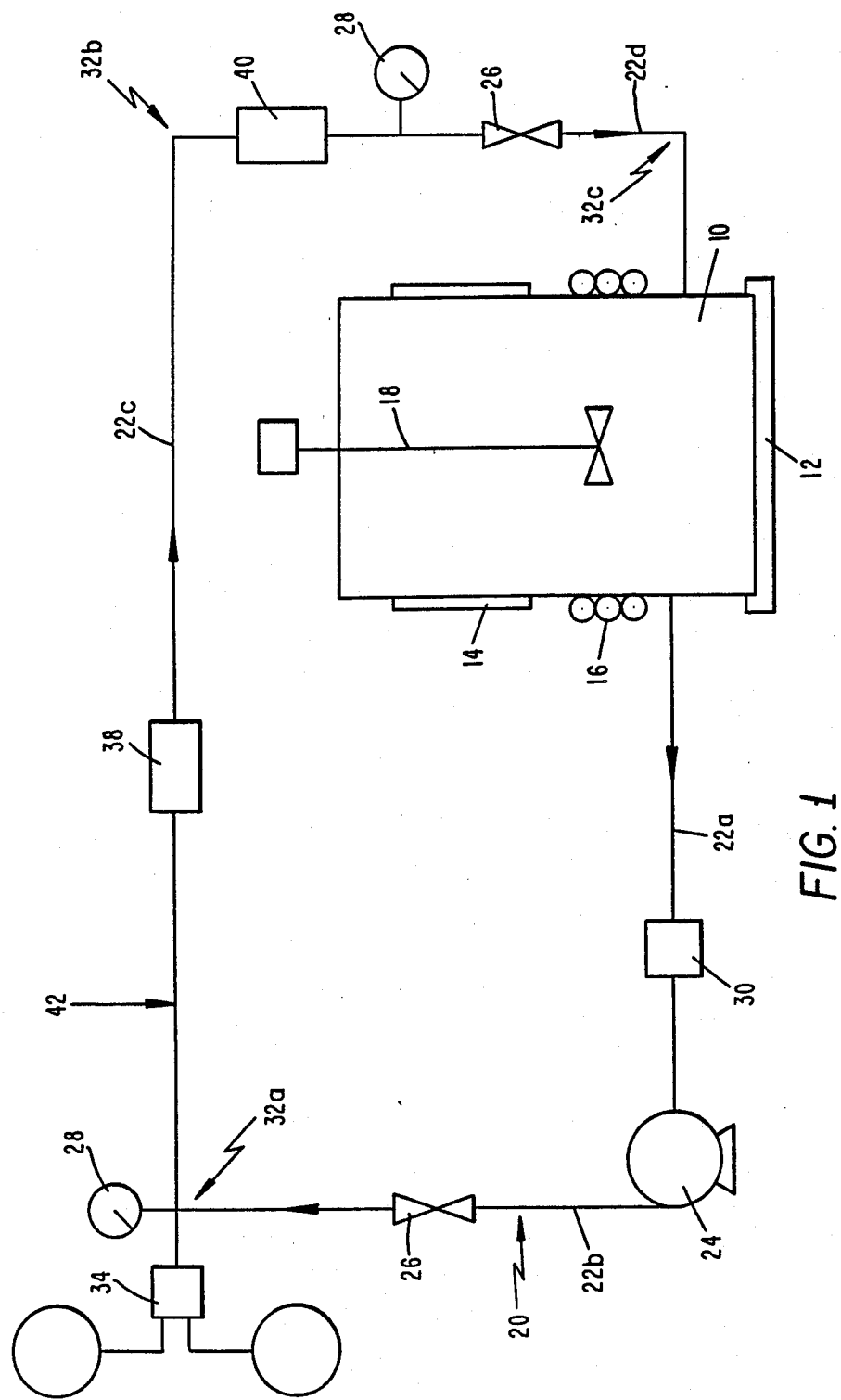
FIG. 1 discloses a flow diagram of one embodiment of the method according to the present invention.
Figure 2:
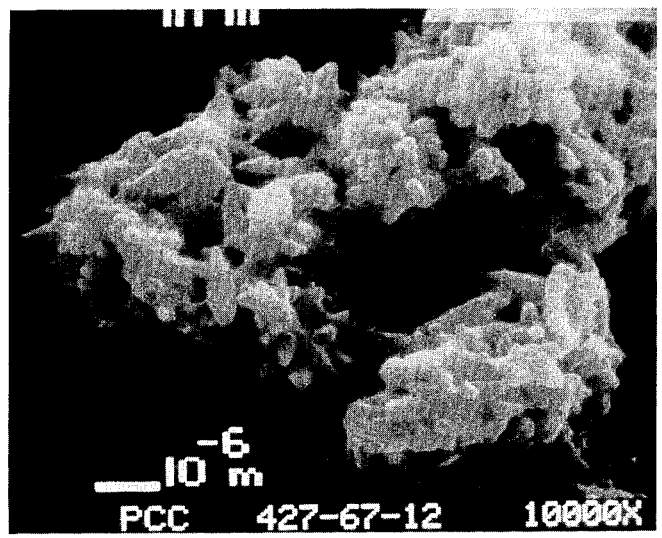
FIGS. 2–5 are SEM photographs of the precipitated calcium carbonate produced according to the present method as described in Example 4.
Figure 3:
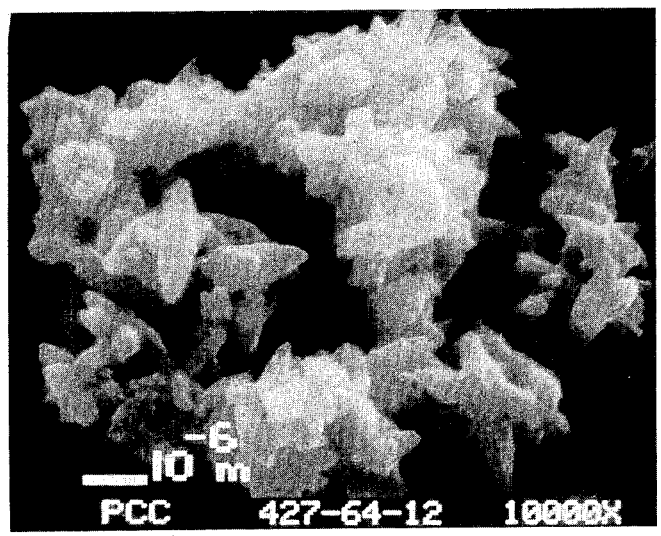
Figure 4:
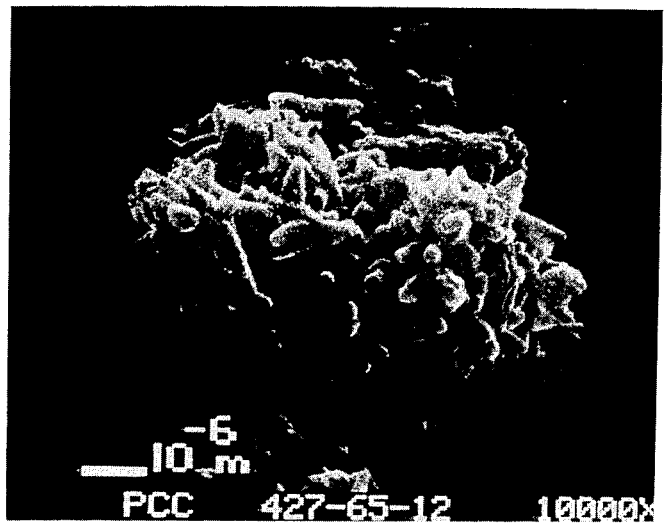
Figure 5:
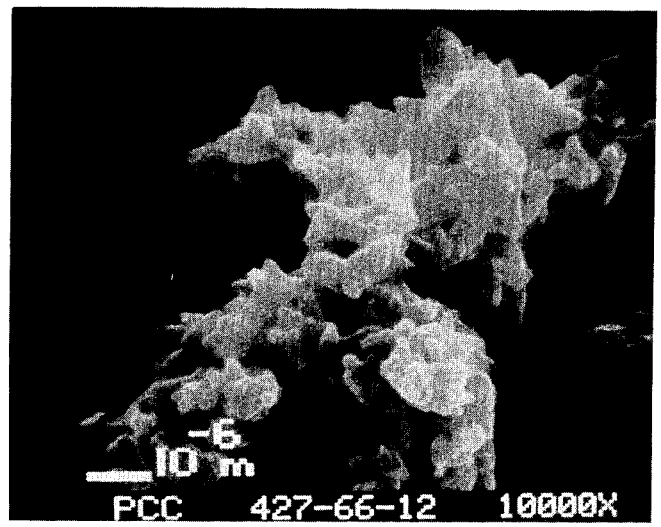

The present invention relates to a carbonation process for producing calcium carbonate from calcium hydroxide derived from limestone which provides improved utilization of the carbon dioxide gas used for the carbonation process. Generally, a gas containing carbon dioxide is injected into a recirculating stream flowing in a recycle piping system which is in communication with a reaction vessel. The carbon dioxide-containing gas is injected at a turbulent point or area located in the recycle piping system.

The Figure discloses a schematic flow diagram of the process according to the present invention. A reaction vessel 10 is provided and includes means for maintaining the temperature of the reaction vessel contents in a desired range. These means may be heating or cooling apparatus well known in the art and in the Figure are disclosed as a heating plate 12, a heating band 14 and a cooling coil 16. The reaction vessel 10 is further provided with an agitator or stirrer 18 which maintains the contents of the reaction vessel in a homogeneous state. A recycle piping system 20 is in communication with the reaction vessel 10 and allows the contents of the reaction vessel to travel through the various piping legs 22A–D of the recycle piping system and then return to the reaction vessel. Various pumps 24, valves 26, pressure gauges 28, flow meters 30 and in-line mixers 38, 40 may be included in the recycle piping system as is necessary.

The recycle piping system includes at least one turbulent area or point. A turbulent area is defined as an area where the fluid flow is abruptly changed and which causes turbulence in the flowing fluid. For example, the bends connecting adjacent legs 22 of the recycle piping system provide turbulent areas. Turbulent bends 32A–C are included in the recycle piping system set forth in the figure. Additionally, in-line mixers or other flow disturbing means may be included to provide turbulent areas in the recycle piping system.

In accordance with an important aspect of the present invention, a gas comprising carbon dioxide is injected into the recirculating stream at one of the turbulent areas located in the recycle piping system. The injection of the carbon dioxide containing gas at a turbulent area in the recycle piping system provides intimate mixing of the gas and the recirculating stream and the carbon dioxide utilization in the final calcium carbonate compound product approaches 100%. The carbon dioxide containing gas may comprise pure carbon dioxide or may include a mixture of carbon dioxide and air or other gas which is intimately mixed, for example in a gas flow meter/mixer 34, before injection into the recirculating stream at the turbulent bend. Preferably, there is at least one of the in-line mixers 38, 40 located in the recycle piping system downstream of the turbulent area, for example the piping bend 32a, where the carbon dioxide is injected into the recirculating stream. The in-line mixer provides further intimate mixing of the gas and the recirculating stream.

In a first embodiment of the invention, an aqueous calcium hydroxide slurry is provided in the reaction vessel and is recirculated through the recycle piping system. The calcium hydroxide slurry may be prepared in any manner known in the art. For example, limestone is calcined to produce quick lime, which is then slaked in water to form a calcium hydroxide slurry. The calcium hydroxide slurry may be screened to remove grit before use in the method of the present invention. The slurry preferably has a solid content of from about 10 to about 20 weight percent. Higher amounts within this range allow the precipitated products to cluster together. The calcium hydroxide slurry generally has a pH value between about 11.5 and 12.

At least a portion of the aqueous slurry is continuously recirculated through the recycle piping system. The carbon dioxide containing gas is injected into the recirculating aqueous slurry at a turbulent area located in the recycle piping system as set forth above. The gas injection should be continued until the pH of the aqueous slurry is in the approximate range of from 8 to 10, and preferably is about 9, at which time the gas injection is discontinued.

In a second embodiment of the method according to the present invention, the reaction vessel contains water and at least a portion of the water is continually recirculated through a recycle piping system in communication with the reaction vessel. The carbon dioxide containing gas is injected into the recirculating water at a turbulent area located in the recycle piping system as set forth above until the pH of the water is in the approximate range of from 5 to 7, and preferably about 6. At that time, while continuing the gas injection, calcium hydroxide is added to the reaction vessel at a rate to provide the resultant slurry formed in the reaction vessel with a pH value in the approximate range of from 8 to 10, preferably about 8 to 9. In this embodiment, the calcium hydroxide is preferably added in the form of an aqueous slurry as described above.

According to either of the embodiments set forth above, once the pH value of the resultant mixture is in the approximate range of from 8 to 10, the gas injection and calcium hydroxide addition are discontinued. The resultant mixture is allowed to digest and agitate for a period of time in order to expose new calcium hydroxide surfaces. More particularly, the pH of the resultant slurry will tend to rise because as the calcium carbonate precipitates on the surfaces of the calcium hydroxide, the precipitated product flakes off and exposes fresh calcium hydroxide having a higher pH value. Optionally, once the pH of the resultant aqueous slurry rises to at least about 10.5, preferably 11, injection of a carbon dioxide containing gas may again be initiated into the recirculating aqueous slurry at a turbulent area located in the recycle piping system until the pH of the aqueous slurry is again in the approximate range of from 8 to 10, at which time the gas injection is discontinued. The resultant precipitated calcium carbonate product has virtually no unreacted calcium hydroxide present, and the precipitated calcium carbonate product may then be washed, filtered, dried and/or milled depending on its intended use.

Preferably, agitation of the reactor contents is continued throughout the reaction process.

The initial temperature of the recycle stream and reactor contents prior to injection of the carbon dioxide containing gas at the turbulent area is an important factor in determining the type of precipitated calcium carbonate product which is produced. Preferably, the initial temperature of the recycle stream and reactor contents prior to injection of the carbon dioxide containing gas is in the approximate range of from about 0° to 90° C. Temperatures below about 30° C. cause the formation of a very fine precipitated calcium carbonate product having an average size less than about 0.5 um. Additionally, initial temperatures of less than about 10° C. cause the formation of even finer precipitated calcium carbonate having an average size of approximately 0.01 to 0.02 um. Additionally, these fine calcium carbonate precipitates exhibit high surface area properties and generally have surface areas greater than 30 $m^2/g$. At temperatures of about 40° or greater, scalenohedral precipitated calcium carbonate is formed. As the initial temperature of the recycle stream and reactor contents prior to carbon dioxide injection is increased above, for example, 65° C., the scalenohedral calcium carbonate which is formed is larger in size. For example, when the temperature is in the range of from 50° to 60° C., the scalenohedral calcium carbonate has a size of from 0.5 to 1.0 um and when the temperature is greater than about 65° C. up to about 80° C., the scalenohedral calcium carbonate has an average particle size of from 1 to 2 um. According to the process of the present invention, scalenohedral calcite has been produced at temperatures as high as 90° C.

The recycle flow rate should be high enough to fill the recycle lines with the stream in order to maintain carbon dioxide utilization efficiency. Low flow rates which also fill the recycle lines assist in forming clustered precipitated calcium carbonate products. The optimum carbon dioxide injection rate is dependent on the reactor and recycle system sizes. Generally, lower carbon dioxide flow rates increase the reaction time.

According to another embodiment of the process according to the present invention, the aqueous calcium hydroxide slurry may be provided with an additive which inhibits crystal growth of the calcium carbonate and contributes to the formation of fine precipitates having increased surface area. For example, as set forth above, a low initial temperature, for example, less than 10° C., causes the formation of fine calcium carbonate precipitates having high surface areas. For example, precipitated calcium carbonate having a surface area of from 30 to 40 $m^2/g$ may be produced. Additionally, if a crystal growth inhibiting additive is added, the surface areas of the precipitated calcium carbonate particles may be increased up to, for example, 65 $m^2/g$ or higher. Suitable crystal growth inhibiting additives include but are not limited to sodium hexametaphosphate, ethylene diamine tetraacetic acid and tetrasodium pyrophosphate. These additives may be used in small amounts, for example, up to about 1 wt. % of the aqueous calcium hydroxide slurry, in order to provide the fine precipitated calcium carbonate particles with even greater surface area properties.

The following examples demonstrate the preparation of various calcium carbonate products using the instant methods.

EXAMPLE 1

Calcium carbonate was prepared according to the of the present invention as follows. Three gallons of a calcium hydroxide aqueous slurry containing 17-20% solids was provided in a five gallon reactor vessel. A recycle flow of 6 gpm was initiated, which ensured that the recycle lines were totally filled with slurry. The length of the total recycle piping system was approximately 15 feet. The reactor contents were agitated at approximately 700-800 rpm using a 3 inch diameter turbine. Carbon dioxide was injected at a turbulent area comprising a bend in the recycle piping system, downstream of which bend an in-line static mixer was provided. The schematic flow diagram of FIG. 1 is similar to the design of the system used in this example, and the recycle was returned to the lower area of the reactor. The initial pH of the aqueous slurry was approximately 11.5 to 12.0. The carbon dioxide was injected until the pH dropped to 9.0, at which time the carbon dioxide flow was stopped, and the batch was allowed to recycle and agitate for a period of ten to fifteen minutes. During this digestion period, the pH rose to about 10.5 to 11. This is a result of the calcium carbonate precipitates which formed at the surface of the calcium hydroxide particles and then flaked off to expose new calcium hydroxide surfaces. The carbon dioxide injection was then resumed until the pH of the mixture was adjusted back to 9.0. The resultant precipitated calcium carbonate product had virtually no unreacted calcium hydroxide present.

The carbon dioxide flow rate was varied between 5 and 8 lpm. At 5 lpm, the carbon dioxide utilization was approximately 100%, while at 8 lpm, the carbon dioxide utilization was approximately 85%. Both of these figures demonstrate the improved carbon dioxide utilization provided by the method according to the present invention wherein the carbon dioxide containing gas is injected into a recirculating stream at a turbulent area in the recycle piping system. The efficiency for the carbonation reactions were calculated by first determining the amount of calcium hydroxide used (weight of lime slurry multiplied by the weight percent solids). The amount of carbon dioxide necessary to convert this calcium hydroxide to calcium carbonate was then calculated according to equation 3 previously set forth in the specification. The amount of carbon dioxide was then converted to liters of carbon dioxide and divided by the carbon dioxide flow rate to yield a theoretical time for the batch. The efficiency for the reaction was then determined by dividing the theoretical time by the actual batch time.

At or below 30° C. a very fine precipitate having an average size less than 0.5 um was formed. At 40° C., scalenohedral calcium carbonate was formed having an average particle size of 0.5 um. At temperatures of from 50-60° C., scalenohedral calcium carbonate having an average particle size of 0.5 to 1.0 um were formed, and at temperatures of 75-80° C., scalenohedral calcium carbonate having an average particle size of from 1 to 2 um was formed. These temperatures refer to the initial temperature of the slurry and recycle stream prior to carbon dioxide injection in the recycle piping system.

EXAMPLE 2

This example demonstrates the method of the present invention for producing calcium carbonate using a thirty gallon reactor vessel. The recycle system was arranged similar to the flow diagram set forth in FIG. 1, with the recycle line returning to the top of the reactor. Twenty to twenty-five gallons of a calcium hydroxide slurry containing 17-20% solids were provided in the reaction vessel. A recycle flow of 13-16 gpm was initiated, and the recycle lines were filled with the recirculating slurry. The length of the recycle piping system was approximately 16 feet. Agitation was Example 1 was followed to produce a calcium carbonate product. The carbon dioxide injection flow was varied between 50 and 100 lpm, whereby 100-85% carbon dioxide utilization efficiency was achieved, respectively.

At 50° C. a small scalenohedral calcium carbonate precipitate was formed having an average particle size of approximately 0.5 um. At 65° C., a scalenohedral calcium carbonate precipitate was formed having an average particle size of approximately 1 um and at 85° C., a scalenohedral calcium carbonate product was produced having an average particle size of 2 um.

EXAMPLE 3

This example demonstrates a method for producing calcium carbonate according to the present invention using a 400 gallon reaction vessel. The reaction system was designed in a manner similar to that of Example 2. Three hundred gallons of a calcium hydroxide slurry having 17-20% solids was provided in the reaction vessel. A recycle flow of 20-25 gpm was established and filled the recycle piping system. The recycle piping system had a length of approximately 37 feet. Agitation was provided in the reactor at 100 rpm. The initial carbonation temperature was from 50°-60° C. The carbon dioxide flow rate was varied between 150 and 250 lpm and provided a carbonation efficiency of 100 to 85%, respectively. Scalenohedral calcium carbonate products having an average particle size of approximately 0.5 um were produced.

EXAMPLE 4

This example demonstrates the preparation of a scalenohedral calcium carbonate product having high porosity using the method according to the present invention. The 30 gallon reaction system of Example 2 was used to prepare the product in this example. Twenty to twenty-five gallons of a calcium hydroxide slurry having 17-20% solids were provided in the 30 gallon reactor vessel. A recycle flow rate of 8 gpm was initiated and agitation of the reactor contents was provided at 300 rpm. The initial temperature of the recycle stream and reactor contents was approximately 65° C. prior to the initiation of carbon dioxide injection. Carbon dioxide gas was then injected at a turbulent area located approximately as shown in FIG. 1 at a rate of 30 lpm. The carbon dioxide injection was continued until the pH of the aqueous slurry in the reaction vessel was in the range of about 10.5 to 10.75, at which time the carbon dioxide injection was discontinued. The slurry was allowed to digest while continuing recycle and agitation for a period of 1 to 2 hours. The relatively lower flow rates and digestion period allowed the precipitated calcium carbonate particles to agglomerate into clusters. After the digestion period, the carbon dioxide injection was resumed until the pH of the aqueous slurry was approximately 9.0, and precipitation of the calcium carbonate product was complete. The thus formed calcium carbonate product may be dried and milled without de-agglomeration of the clusters. If it is not necessary to mill the dried product, the intermediate digestion period is not required. The clusters of calcium carbonate particles which were produced tend to be star-shaped. FIGS. 2-5 are SEM photographs (10,000×) of the precipitated calcium carbonate produced according to this example. These photographs clearly show the scalenohedral and star-shaped clustering nature of the calcium carbonate product of this example.

EXAMPLE 5

Figure 6:
FIG. 6 is a TEM photograph of the precipitated calcium carbonate produced according to the present method as described in Example 5.

This example demonstrates the production of a high surface area, small particle size calcium carbonate product using the method of the present invention. The five gallon reactor system of Example 1 was used in the method of this example. A calcium hydroxide slurry having 10-15% solids was provided in the reactor vessel. A recycle flow of 6 gpm was initiated and agitation was provided at 180-200 rpm. The initial temperature of the recycle stream and the reactor contents prior to carbon dioxide injection was between 0 and 10° C.. Carbon dioxide was injected at a turbulent area in the recycle piping system as generally shown in FIG. 1 at a flow rate of 5 to 10 lpm. Without using any crystal growth inhibiting additive, a very fine calcium carbonate precipitate having an average particle size less than about 0.5 um and a surface area of about 30 to 40 $m^2/g$ was produced. Using 0.5 wt. % of ethylene diamine tetraacetic acid in the reaction slurry produced a very fine calcium carbonate precipitate having a surface area of approximately 50 $m^2g/g$. Using 0.5 to 1 wt. % of sodium hexametaphosphate in the reaction slurry provided a very fine calcium carbonate precipitate having a surface area of from about 60 to 65 $m^2/g$. It is believed that these additives serve to inhibit crystal growth of the calcium carbonate precipitate and thereby provide precipitates having higher surface area properties. FIG. 6 is a TEM photograph (100,000×) of the calcium carbonate produced according to this example using sodium hexametaphosphate, which calcium carbonate exhibited an average particle size of 0.015 um and a surface area equal to 56.4 $m^2/g$.

EXAMPLE 6

Figure 7:
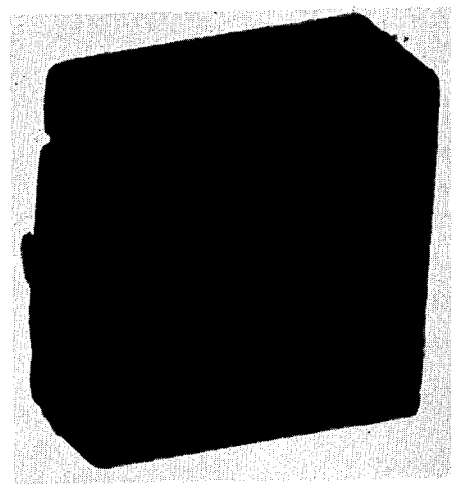
FIG. 7 is a TEM photograph of the precipitated calcium carbonate produced according to the present method as described in Example 6.
Figure 8:
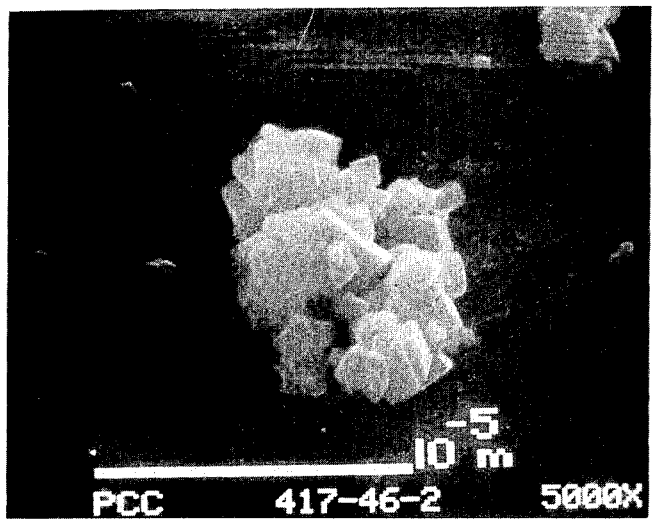
FIGS. 8 and 9 are SEM photographs of the precipitated calcium carbonate produced according to the present method as described in Example 6.
Figure 9:
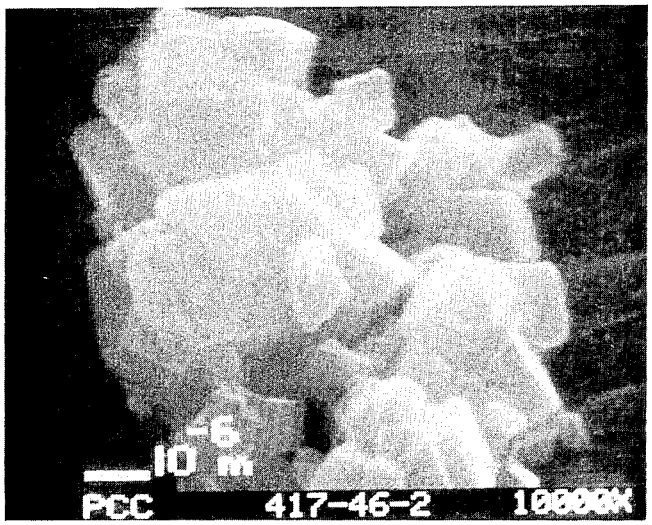

This example demonstrates the production of a cuboidal precipitated calcium carbonate product using the method of the present invention The five gallon reactor system of Example 1 was used in this example. Water was provided in the reaction vessel and recirculated through the recycle piping system. Carbon dioxide was injected into the recycle stream at a turbulent area in the recycle piping system generally as shown in FIG. 1. The carbon dioxide injection was continued until the pH of the water was approximately 6.0. While the carbon dioxide injection was continued, an aqueous calcium hydroxide slurry was pumped into the reactor at a rate so that the pH of the resultant slurry formed in the reaction vessel was maintained between 8 and 9. The resultant calcium carbonate product had a cuboidal shape and a unique combination of physical properties For example, the cuboidal calcium carbonate product exhibited an oil absorption value of approximately 30 to 35 cc/100 g, a surface area of 2 to 4 $m^2/g$, a Gardiner brightness of 92 to 95, a pour/pack density of 0.5/1.0 g/ml and an average particle size of 1 to 3 um. Additionally, the cuboidal calcium carbonate exhibited a high valley abrasion in the range of from 10-28 mg loss. FIG. 7 is a TEM (20,000×) photograph of the calcium carbonate produced according to this example, and FIGS. 8 and 9 are SEM photographs (5000× and 10,000×, respectively) of the calcium carbonate produced according to this example.

Thus, the preceding examples demonstrate that the method according to the present invention provides improved carbon dioxide utilization efficiency and results in the formation of various precipitated calcium carbonate products. These examples are set forth to illustrate specific embodiments of the invention and are not intended to limit the scope of the methods and compositions of the present invention. Additional embodiments and advantages within the scope of the claimed invention will be apparent to one of ordinary skill in the art.

What is claimed is:

1. A method for producing calcium carbonate, comprising the steps of:
    (a) providing an aqueous calcium hydroxide slurry in a reaction vessel;
    (b) continuously recirculating at least a portion of the aqueous slurry through a recycle piping system in communication with the reaction vessel; and
    (c) injecting a gas comprising carbon dioxide into the recirculating aqueous slurry at a turbulent area located in the recycle piping system until the pH of the aqueous slurry in the reaction vessel is in the approximate range of from 8 to 10, at which time the gas injection is discontinued.

2. A method for producing calcium carbonate, comprising the steps of:
    (a) providing a reaction vessel containing water;
    (b) continuously recirculating at least a portion of the water through a recycle piping system in communication with the reaction vessel;
    (c) injecting a gas comprising carbon dioxide into the recirculating water at a turbulent area located in the recycle piping system until the pH of the water is in the approximate range of from 5 to 7; and
    (d) adding calcium hydroxide to the reaction vessel while continuing the gas injection at a rate to provide the resultant slurry formed in the reaction vessel with a pH value in the approximate range of from 8 to 10.

3. A method for producing calcium carbonate as defined by claim 1, wherein the aqueous calcium hydroxide slurry comprises about 10 to about 20 weight percent solids.

4. A method for producing calcium carbonate as defined by claim 3, wherein the aqueous calcium hydroxide slurry comprises greater than 15 weight percent solids.

5. A method for producing calcium carbonate as defined by claim 3, wherein the aqueous calcium hydroxide slurry comprises less than 15 weight percent solids.

6. A method for producing calcium carbonate as defined by claim 1, wherein the aqueous slurry temperature prior to injection of the gas is in the approximate range of from 0° to 90° C.

7. A method for producing calcium carbonate as defined by claim 6, wherein the aqueous slurry temperature prior to injection of the gas is less than about 10° C.

8. A method for producing calcium carbonate as defined by claim 6, wherein the aqueous slurry temperature prior to injection of the gas is greater than about 65° C.

9. A method for producing calcium carbonate as defined by claim 1, wherein the contents of the reaction vessel are continuously agitated.

10. A method for producing calcium carbonate as defined by claim 2, wherein the contents of the reaction vessel are continuously agitated.

11. A method for producing calcium carbonate as defined by claim 1, wherein the injected gas comprises pure carbon dioxide.

12. A method for producing calcium carbonate as defined by claim 2, wherein the injected gas comprises pure carbon dioxide.

13. A method for producing calcium carbonate as defined by claim 1, wherein the injected gas comprises a mixture of carbon dioxide and air.

14. A method for producing calcium carbonate as defined by claim 2, wherein the injected gas comprises a mixture of carbon dioxide and air.

15. A method for producing calcium carbonate as defined by claim 1, wherein the gas injection is discontinued once the pH of the aqueous slurry is approximately 9.

16. A method for producing calcium carbonate as defined by claim 2, wherein the gas injection is discontinued once the pH of the water is approximately 6.

17. A method for producing calcium carbonate as defined by claim 2, calcium hydroxide is added to the reaction vessel in the form of an aqueous slurry.

18. A method for producing calcium carbonate as defined by claim 2, wherein the calcium hydroxide is added to the reaction vessel at a rate to maintain the pH of the resultant slurry at approximately 8 to 9.

19. A method for producing calcium carbonate as defined in claim 1, wherein the aqueous calcium hydroxide slurry includes not greater than 1 weight percent of an additive for inhibiting crystal growth of the calcium carbonate selected from the group consisting of sodium hexametaphosphate, ethylenediaminetetraacetic acid, and tetrasodium pyrophosphate.

20. A method for producing calcium carbonate, comprising the steps of:
    (a) providing an aqueous calcium hydroxide slurry in a reaction vessel;
    (b) continuously recirculating at least a portion of the aqueous slurry through a recycle piping system in communication with the reaction vessel;
    (c) injecting a gas comprising carbon dioxide into the recirculating aqueous slurry at a turbulent area located in the recycle piping system until the pH of the aqueous slurry in the reaction vessel is at a first interim value in the approximate range of from 8 to 10, at which time the gas injection is discontinued;
    (d) continuing the recirculation of at least a portion of the aqueous slurry after the gas injection has been discontinued until the pH of the aqueous slurry in the reaction vessel rises to a second value above said first interim value as calcium carbonate which forms at the surface of calcium hydroxide particles flakes off and exposes new calcium hydroxide surfaces; and
    (e) again injecting a gas comprising carbon dioxide into the recirculating aqueous slurry at a turbulent area located in the recycle piping system until the pH of the aqueous slurry is at a third final value in the approximate range of from 8 to 10, at which time the gas injection is discontinued.

* * * * *